(12) United States Patent
Swanson

(10) Patent No.: US 6,886,258 B2
(45) Date of Patent: May 3, 2005

(54) HAND-HELD ROTARY HEDGE TRIMMER

(75) Inventor: Richard C. Swanson, 5 Colony Dr., Orchard Park, NY (US) 14127

(73) Assignee: Richard C. Swanson, Orchard Park, NY (US)

( * ) Notice: Subject to any disclaimer, the term of this patent is extended or adjusted under 35 U.S.C. 154(b) by 0 days.

(21) Appl. No.: 10/295,464

(22) Filed: Nov. 15, 2002

(65) Prior Publication Data

US 2004/0093740 A1 May 20, 2004

(51) Int. Cl.$^7$ .............................................. A01D 34/71
(52) U.S. Cl. ........................ 30/276; 30/296.1; 56/12.7
(58) Field of Search ............................... 30/276, 296.1, 30/347, 263, 264, 286; 56/12.7, 233, 237; D8/8; 451/451, 452, 455, 456

(56) References Cited

U.S. PATENT DOCUMENTS

| | | | |
|---|---|---|---|
| 1,579,783 A | | 4/1926 | Ross |
| 2,091,827 A | | 8/1937 | Mercatoris |
| 2,697,457 A | | 12/1954 | Lawrence |
| D187,663 S | * | 4/1960 | Ellison ............................ D8/8 |
| 3,546,865 A | | 12/1970 | Woodward |
| RE29,139 E | | 2/1977 | Messner |
| 4,242,794 A | * | 1/1981 | Peterson ....................... 30/276 |
| 4,641,431 A | | 2/1987 | Leming et al. |
| 4,987,681 A | | 1/1991 | Sepke |
| 5,005,321 A | * | 4/1991 | Barth et al. .................. 451/451 |
| 5,031,325 A | * | 7/1991 | Walter et al. ................ 451/451 |
| 5,210,996 A | | 5/1993 | Fassauer |
| 5,545,082 A | | 8/1996 | Courson et al. |
| 5,588,289 A | | 12/1996 | Wilson |
| 5,862,595 A | | 1/1999 | Keane |
| 6,014,812 A | | 1/2000 | Webster |
| 6,105,253 A | | 8/2000 | Kolbert |
| 6,460,253 B1 | * | 10/2002 | Wheeler et al. .............. 30/276 |

FOREIGN PATENT DOCUMENTS

| | | | |
|---|---|---|---|
| JP | 63150164 | * | 6/1988 |
| WO | WO 03/020010 A1 | | 3/2003 |

* cited by examiner

*Primary Examiner*—Stephen Choi
(74) *Attorney, Agent, or Firm*—Hodgson Russ LLP

(57) ABSTRACT

A hand-held rotary trimmer comprises a removable multi-piece shroud for covering a drive shaft and rotary cutter of the trimmer. The shroud includes an opening for feeding vegetation to the rotary cutter and an expulsion duct extending in a direction generally tangential to a rotational direction of the rotary cutter. In the preferred embodiment, the shroud includes three pieces formed of molded plastic. A first piece of the shroud has a hood portion and a first half-collar portion integrally formed with the hood portion. A second piece of the shroud has a second half-collar portion removably attached to the first half-collar portion of the first piece for releasably clamping the shroud on the trimmer housing and a flange portion integrally formed with the second half-collar portion and arranged to be flush against the hood portion of the first piece. A third piece of the shroud is ring-shaped and attaches to a bottom end of the hood portion, thereby defining the area of the opening through which vegetation is fed to the rotary cutter. Each of the three pieces is preferably formed of lightweight molded plastic to minimize user muscle fatigue.

10 Claims, 3 Drawing Sheets

HAND-HELD ROTARY HEDGE TRIMMER

FIELD OF INVENTION

The present invention relates to the field of vegetation trimmers for hedges and the like, and more particularly to a hand-held rotary hedge trimmer having a removable shroud for protecting the user from the trimmer's rotary cutter and for channeling clippings to a receptacle in communication with the shroud.

BACKGROUND OF THE INVENTION

Automatic reciprocating-blade hedge trimmers are well-known, but are ill-suited for channeling clippings to an attached receptacle or collection bag.

Rotary trimmers having a motor-driven rotating cutter are also known, and are better suited for channeling clippings to a receptacle, if desired. Such devices are typically configured to have an elongated hand-held housing, a motor contained by the hand-held housing, a drive shaft connected to the motor and mounted at a distal end of the housing for rotation about an axis that is substantially perpendicular to a longitudinal axis of the housing, a rotary cutter fixed to the drive shaft for rotation therewith, and a protective shroud or hood mounted on the housing to cover the rotary cutter and define an opening through which vegetation is fed to the cutter. An example of a trimmer of the type described above is found in U.S. Pat. No. 4,641,431 to Leming et al. In the trimmer of Leming et al., the motor is located in a cylindrical housing portion at the distal end of the hand-held housing, and the drive shaft and a surrounding tube, both of which are threaded, extend downward from the cylindrical housing portion. The shroud, which is generally frusto-conical in shape, includes a mounting aperture through a top wall thereof, and the drive shaft and tube are inserted through the mounting aperture to extend into the interior of the shroud. A spring arranged about the tube and a nut threadably mated to the tube releasably clamp the top wall of the shroud against a bottom surface of the cylindrical housing portion, and angularly spaced detents between the top wall of the shroud and the cylindrical housing portion prevent rotation of the shroud relative to the cylindrical housing portion.

As another example, U.S. Pat. No. 4,987,681 discloses a trimmer of the type mentioned above, wherein the shroud includes a rear portion integrally formed with the hand-held motor housing and a complementary front portion having a resilient collar for snap-fitting to the hand-held housing.

U.S. Pat. No. 5,545,082 provides a further example of a trimmer construction of the prior art.

As a final example, U.S. Pat. No. 6,105,253 discloses a hand-held rotary trimmer comprising a handle 5 which houses a motor drive, a rotary cutter (rotary 11 and blades 9) powered by the motor drive, and a shroud (hood 2) mounted at a distal end of the handle/housing to cover the rotary cutter for operator safety. The shroud includes an annular protective ridge 10 about a bottom opening in the shroud and an expulsion duct (connector 12) extending tangentially to a rotational direction of the cutter for delivering clippings or trimmings to a collection bag connected to the expulsion duct. In the embodiment described, the collection bag is supported by means of a strap over the user's shoulder. The shroud (hood 2) is depicted as a one-piece unit, which makes it difficult to remove to install a new rotary cutter or to clean the interior of the shroud or expulsion duct if clogs develop.

BRIEF SUMMARY OF THE INVENTION

Therefore, the present invention seeks to provide a hand-held rotary vegetation trimmer with a shroud that is lightweight, strong, easy to mount or remove, and inexpensive to manufacture and ship.

In furtherance of these objects, a hand-held rotary trimmer formed in accordance with a preferred embodiment of the present invention generally comprises a housing, a motor contained within the housing, a rotatable drive shaft extending from said housing and operably connected to the motor, a rotary cutter mounted on the drive shaft, and a multi-piece shroud removably attached to the housing for covering the drive shaft and the rotary cutter.

The shroud includes an opening for feeding vegetation to the rotary cutter and an expulsion duct extending in a direction generally tangential to a rotational direction of the rotary cutter. In the preferred embodiment, the shroud includes three pieces formed of molded plastic. A first piece of the shroud has a hood portion and a first half-collar portion integrally formed with the hood portion. A second piece of the shroud has a second half-collar portion removably attached to the first half-collar portion of the first piece for releasably clamping the shroud on the trimmer housing and a flange portion integrally formed with the second half-collar portion and arranged to be flush against the hood portion of the first piece. A third piece of the shroud is ring-shaped and attaches to a bottom end of the hood portion, thereby defining the area of the opening through which vegetation is fed to the rotary cutter.

Each of the three pieces is formed of lightweight molded plastic. The housing preferably includes an annular groove about the drive shaft, and the first and second half-collar portions of the shroud each include an internal semi-annular ridge received by the annular groove. The second half-collar portion is removably attached to the first half-collar portion by threaded fastening means such that the shroud can be easily removed by loosening the fastening means. Contacting surfaces of the hood portion of the first piece and the flange portion of the second piece are preferably conical for strength purposes. The third piece preferably includes a frusto-conical portion tapered upward toward the rotary cutter for added protection and better vacuum action.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
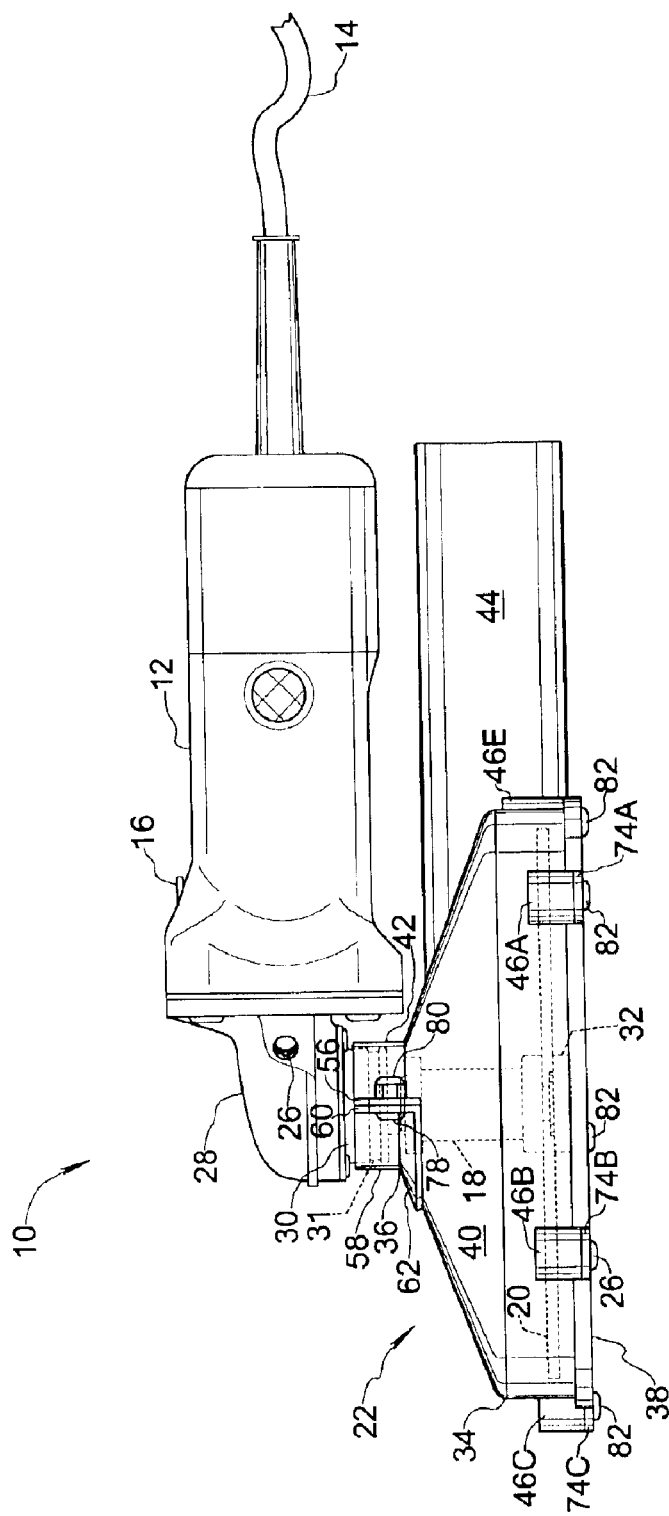
FIG. 1 is a side elevational view of a hand-held rotary trimmer formed in accordance with a preferred embodiment of the present invention.
Figure 2:
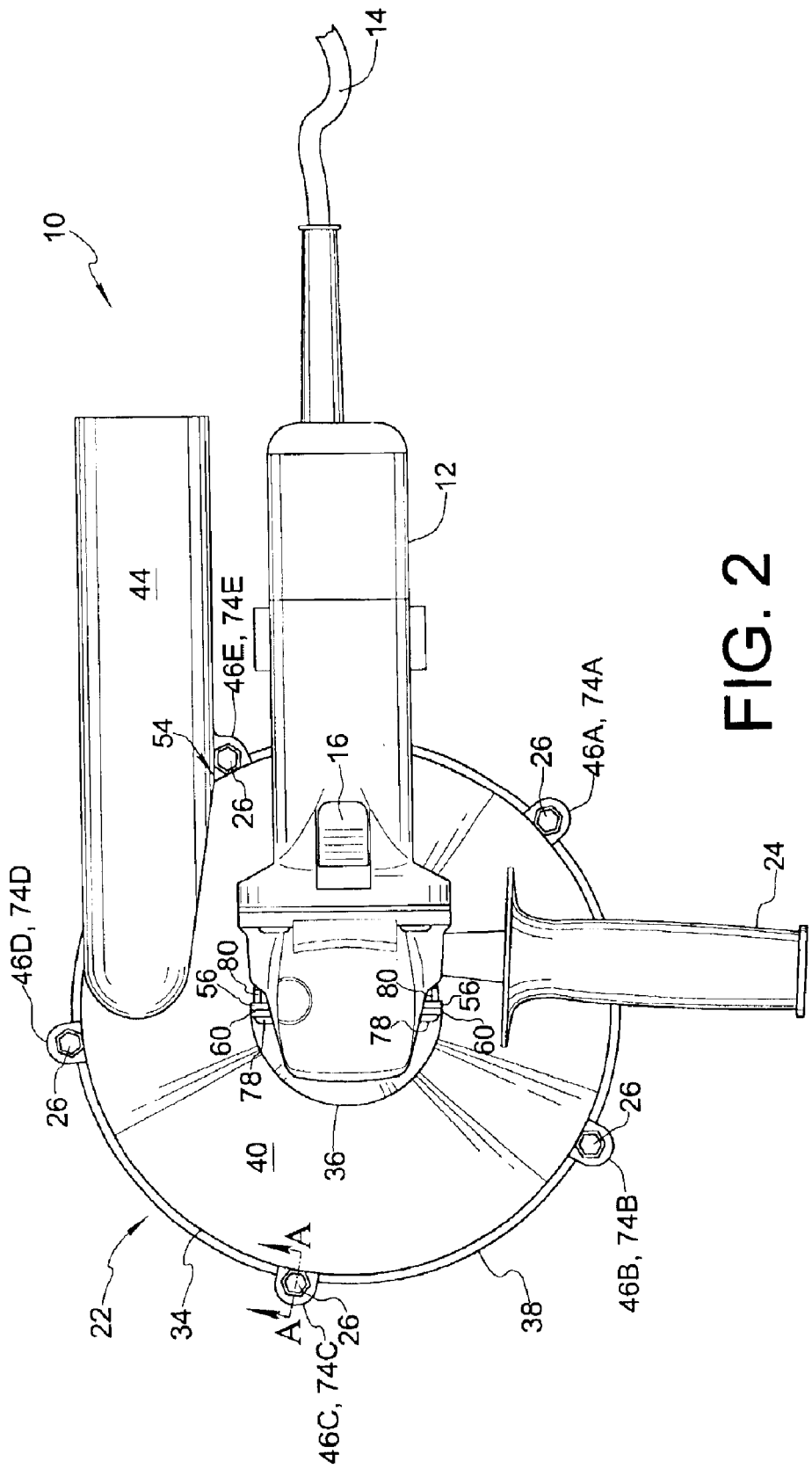
FIG. 2 is a top view of the hand-held rotary trimmer shown in FIG. 1.

Attention is directed initially to FIGS. 1 and 2 of the drawings, wherein a hand-held vegetation trimmer formed in accordance with a preferred embodiment of the present invention is shown and designated generally by the reference numeral 10. Trimmer 10 comprises a housing 12 for enclosing an electric motor (not shown) connected to a power source by an electrical cord 14 extending through a rear or proximal end of housing 12, a power switch 16, a rotatable drive shaft 18 connected to the motor, a rotary cutter 20 mounted on drive shaft 18 for rotation therewith, and a shroud generally designated by reference numeral 22 covering the drive shaft and cutter. A lateral handle 24, shown only in FIG. 2, is threadably attached to housing 12 by mating a threaded stud of the handle within a tapped hole 26 in a front casting 28 of housing 12. Housing 12 includes a neck 30 extending downwardly from front casting 28 as shown in FIG. 1, wherein a portion of drive shaft 18 extends through neck 30. Drive shaft 18 includes means 32 at a distal end thereof for mounting rotary cutter 20 thereon so the cutter rotates with the drive shaft.

Shroud 22 of the present invention preferably comprises three pieces of molded plastic, namely a first piece 34, a second piece 36, and a third piece 38. First piece 34 includes a hood portion 40 that is partially frustoconical and partially cylindrical, a first half-collar portion 42 extending upwardly from the top of hood portion 40, and an expulsion duct 44 extending in a direction generally tangential to a rotational direction of rotary cutter 20.

First piece 34 further includes a plurality of attachment caps 46A–46E spaced at regular angular intervals about the periphery of hood portion 40. Attachment cap 46C, which is characteristic of the other attachment caps, is shown in cross-sectional view in FIG. 5 as having an upper hexagonal recess 48 and a lower cylindrical hole 50 connected by a through-hole 52. As will be appreciated with reference to FIG. 2, expulsion duct 44 forms an acute juncture with hood portion 40, such juncture being generally identified by reference numeral 54. In order to alleviate inherent weakness of first piece 34 at acute juncture 54, an attachment cap 46E is preferably located at the juncture to provide a smoother transition from hood portion 40 to expulsion duct 44. In the preferred embodiment shown in the figures, attachment cap 46E is longer in an axial direction of drive shaft 18 than attachment caps 46A–46D so it can better perform its secondary function of strengthening first piece 34 at acute juncture 54.

First half-collar portion 42 is generally in the shape of a half-cylinder and includes a pair of opposite seam walls 56 each extending in an axial direction of the collar and having fastener hole (not shown) therethrough. First half-collar portion 42 preferably includes an internal semi-annular ridge 57 intended for receipt within an annular groove 31 provided in neck 30. Meanwhile, second piece 36 includes a second half-collar portion 58 that is complementary to first-half-collar portion 42 and includes a counterpart internal semi-annular ridge 59. Second half-collar portion 58 has a pair of seam walls 60 arranged opposite seam walls 56 of the first half-collar portion, each seam wall 60 having a fastener hole (not shown) in alignment with a corresponding fastener hole through an associated seam wall 56. Second piece 36 also includes a semi-annular flange portion 62 about a bottom end of second half-collar portion 58. Flange portion 62 corresponds in frustoconical shape to hood portion 40 of first piece 34 such that, an undersurface 64 of flange portion 62 lies flush against a top surface of hood portion 40. Consequently, when first piece 34 and second piece 36 are assembled, the flange portion 62 of second piece 36 reinforces and stabilizes the assembly.

Figure 3:
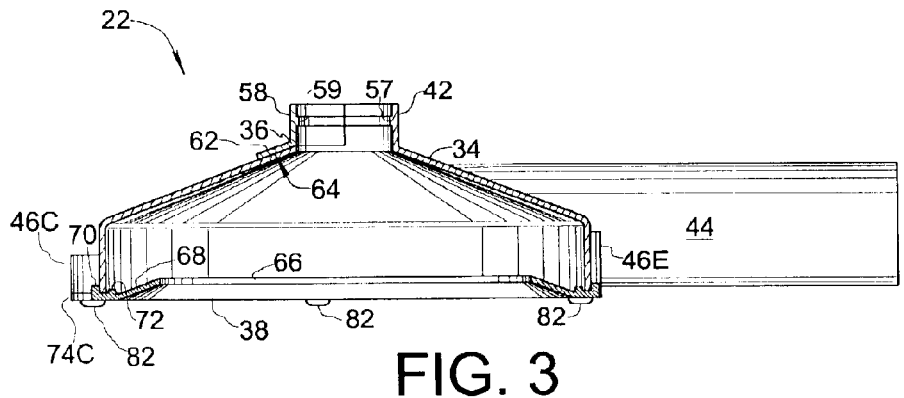
FIG. 3 is a cross-sectional view of a shroud of the rotary trimmer.
Figure 4:
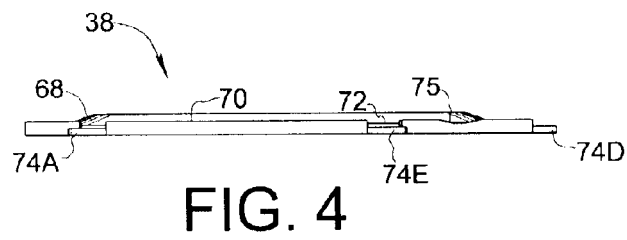
FIG. 4 is a rear end view of a third piece of the shroud shown in FIG. 3.

Third piece 38, best seen in FIGS. 2–4, is generally ring-shaped to define a central opening 66, and includes a frusto-conical portion 68 tapered toward an interior of hood portion 40 of first piece 34. Third piece 38 is designed to be attached to a bottom end of hood portion 40 and defines an opening in shroud 22 through which vegetation is fed to rotary cutter 20. Third piece 38 has an outer rim 70 and an inner rim 72 defining an annular pocket for receiving the cylindrical bottom end of hood portion 40, and a plurality of angularly-spaced attachment tabs 74A–74E projecting radially outward therefrom to register one-to-one with attachment caps 46A–46E on first piece 34. As can be seen in FIG. 4, outer rim 72 is broken at attachment tabs 74A–74E and includes an arcuate recess 75 for accommodating expulsion duct 44. Each attachment tab 74A–74E has a hole 76 through the tab that is aligned with through-hole 52 in the corresponding attachment cap.

Figure 5:
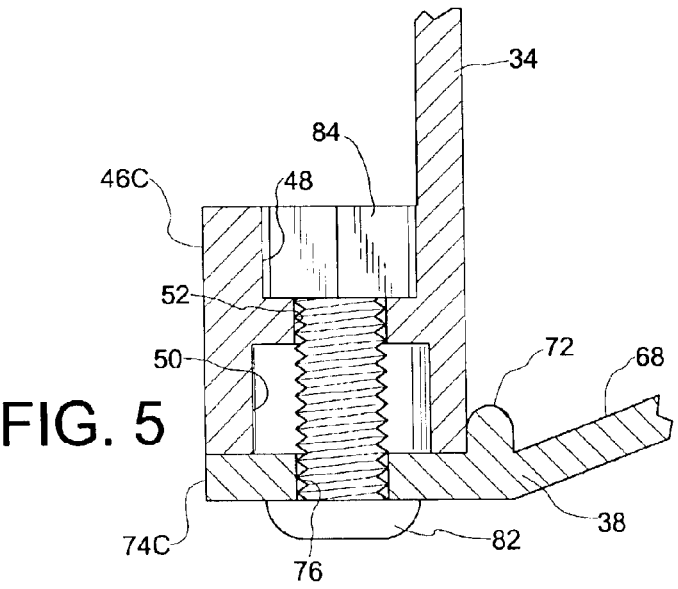
FIG. 5 is an enlarged sectional view taken generally along the line A—A in FIG. 2.

In the preferred embodiment described at present, first through third pieces 34, 36, and 38 of shroud 22 are assembled together using commercially available threaded fasteners. More specifically, first piece 34 and second piece 36 are coupled together by machine screws 78 arranged to pass through aligned holes in seam walls 60 and 56 and mated with corresponding lock nuts 80, whereby first half-collar portion 42 and second half-collar portion 58 clampingly engage neck 30 of housing 12. As will be appreciated, ridges 57 and 59 of the half-collar portions are received by groove 31, such that when screws 78 are tightened, the shroud is securely attached to housing 12 and cannot be pulled off except upon loosening screws 78. With reference especially to FIG. 5, third piece 38 is attached to first piece 34 by machine screws 82 extending through holes 76 and 52 respectively provided in each attachment tab and attachment cap and mating with associated lock nuts 84 held captive in hexagonal recesses 48 of the attachment caps.

While assembly of shroud 22 using threaded fasteners is currently preferred for simplicity and durability reasons, it is of course possible to incorporate resiliently deformable "snap-in" couplings into the pieces 34, 36, and 38 to obviate the need for threaded fasteners. By way of example, rims 70 and 72 and the bottom end of hood portion 40 could be shaped for snap-on attachment and snap-off removal of third piece 38.

What is claimed is:

1. A vegetation trimmer comprising:
   a housing;
   a motor contained within said housing;
   a rotatable drive shall extending from said housing and operably connected to said motor;
   a rotary cutter mounted on said drive shaft for rotation therewith;
   a shroud removably attached to said housing for covering said drive shaft and said rotary cutter, said shroud having an opening for feeding vegetation to said rotary cutter and an expulsion duct extending in a direction generally tangential to a rotational direction of said rotary cutter;
   wherein said shroud includes a first piece having a hood portion and a semi-cylindrical first half-collar portion integrally formed with said hood portion, and a second piece having a semi-cylindrical second half-collar portion removably attached to said first half-collar portion for releasably clamping said shroud on said housing and a flange portion integrally formed with said second half-collar portion and arranged to be flush against said hood portion of said first piece.

2. The vegetation trimmer according to claim 1, wherein said housing includes an annular groove about said drive shaft, and said first and second half-collar portions of said shroud each include an internal semi-annular ridge received by said annular groove.

3. The vegetation trimmer according to claim 1, wherein said second half-collar portion is removably attached to said first half-collar portion by threaded fastening means engaging the first and second half-collar portions.

4. The vegetation trimmer according to claim 1, wherein contacting surfaces of said hood portion of said first piece and said flange portion of said second piece are conical.

5. The vegetation trimmer according to claim 1, wherein said shroud further includes a third piece removably attached to said hood portion of said first piece, said third piece defining said opening of said shroud.

6. The vegetation trimmer according to claim 5, wherein said third piece includes a frusto-conical portion tapered toward an interior of said hood portion of said first piece.

7. The vegetation trimmer according to claim 5, wherein:

said third piece is generally ring-shaped and includes a plurality of angularly-spaced attachment tabs projecting radially outward therefrom;

said first piece includes a plurality of angularly-spaced attachment caps projecting radially outward from said hood portion to respectively correspond with said plurality of attachment tabs of said third piece; and said trimmer further comprises fastening means respectively coupling said plurality of attachment tabs to said plurality of attachment caps.

8. The vegetation trimmer according to claim 7, wherein said fastening means includes a mating nut and bolt for releasably clamping each respective attachment tab to a corresponding attachment cap.

9. The vegetation trimmer according to claim 7, wherein said expulsion duct is integrally formed as part of said first piece to extend from said hood portion, and one of said plurality of attachment caps is provided at an acute juncture between said expulsion duct and said hood portion.

10. The vegetation trimmer according to claim 9, wherein said one of said plurality of attachment caps is longer in an axial direction of said drive shaft than others of said plurality of attachment caps.

* * * * *